(12) United States Patent
Guan et al.

(10) Patent No.: US 12,509,803 B2
(45) Date of Patent: Dec. 30, 2025

(54) HIGH-ELONGATION META-ARAMID FIBER, PREPARATION METHOD AND APPARATUS

(71) Applicant: TAYHO ADVANCED MATERIALS GROUP CO., LTD., Yantai (CN)

(72) Inventors: Zhenhong Guan, Yantai (CN); Jinling Song, Yantai (CN); Xiangyang Leng, Yantai (CN); Xiquan Song, Xi'an (CN); Meige Wang, Yantai (CN); Dong Gao, Yantai (CN)

(73) Assignee: TAYHO ADVANCED MATERIALS GROUP CO., LTD., Yantai (CN)

( * ) Notice: Subject to any disclaimer, the term of this patent is extended or adjusted under 35 U.S.C. 154(b) by 307 days.

(21) Appl. No.: 18/359,565

(22) Filed: Jul. 26, 2023

(65) Prior Publication Data
US 2024/0218567 A1 Jul. 4, 2024

(30) Foreign Application Priority Data

Dec. 29, 2022 (CN) .......................... 202211702421.X

(51) Int. Cl.
*D01F 1/02* (2006.01)
*D01D 1/02* (2006.01)
(Continued)

(52) U.S. Cl.
CPC .............. *D01F 6/905* (2013.01); *D01D 1/02* (2013.01); *D01D 1/103* (2013.01); *D01D 5/06* (2013.01);
(Continued)

(58) Field of Classification Search
CPC D01F 6/905; D01F 1/02; D01F 6/605; D01D 1/02; D01D 1/103; D01D 5/06; D10B 2331/021
See application file for complete search history.

(56) References Cited

U.S. PATENT DOCUMENTS

| | | | | |
|---|---|---|---|---|
| 2015/0114582 A1* | 4/2015 | Lee | ......................... | D21H 21/28 428/402 |
| 2015/0125745 A1* | 5/2015 | Kaneda | .................... | H01M 4/13 427/58 |

(Continued)

FOREIGN PATENT DOCUMENTS

| | | |
|---|---|---|
| CN | 201648274 U | 11/2010 |
| CN | 203474698 U | 3/2014 |

(Continued)

OTHER PUBLICATIONS

First Office Action issued in counterpart Chinese Patent Application No. 202211702421.X, dated Feb. 4, 2023.

*Primary Examiner* — Abbas Rashid
*Assistant Examiner* — Caroline Beha
(74) *Attorney, Agent, or Firm* — Westbridge IP LLC

(57) ABSTRACT

Disclosed are a high-elongation meta-aramid fiber, a preparation method and an apparatus. The high-elongation meta-aramid fiber is prepared by: adding isophthaloyl chloride to a m-phenylenediamine solution, reacting at a stirring speed of 20-30 r/min, and adjusting the pH of the achieved reaction liquid to obtain a first slurry; adding isophthaloyl chloride to a m-phenylenediamine solution, reacting at a stirring speed of 25-35 r/min, adjusting the pH of the achieved reaction liquid, filtering insoluble matter, adding an initiator and isophthaloyl chloride at a stirring speed of 25-35 r/min for reaction, and adjusting the pH of the achieved reaction liquid to obtain a second slurry; uniformly mixing and then de-foaming the two slurries, and producing the high-elongation meta-aramid fiber through a wet spinning process.

8 Claims, 4 Drawing Sheets

(51) Int. Cl.
   *D01D 1/10*  (2006.01)
   *D01D 5/06*  (2006.01)
   *D01F 6/90*  (2006.01)
(52) U.S. Cl.
   CPC .......... *D01F 1/02* (2013.01); *D10B 2331/021* (2013.01)

(56) References Cited

U.S. PATENT DOCUMENTS

2015/0342276 A1* 12/2015 Yamasaki .......... C08G 18/4808
                                              428/221
2018/0355517 A1* 12/2018 Tang .......................... D01F 2/08
2020/0332039 A1* 10/2020 Nakano ................... C08L 33/08

FOREIGN PATENT DOCUMENTS

| CN | 106498538 | A  | 3/2017  |
|----|-----------|----|---------|
| CN | 107779975 | A  | 3/2018  |
| CN | 109056094 | A  | 12/2018 |
| CN | 212441151 | U  | 2/2021  |
| CN | 113668091 | A  | 11/2021 |
| CN | 215277064 | U  | 12/2021 |
| EP | 0567987   | A1 | 11/1993 |

* cited by examiner

HIGH-ELONGATION META-ARAMID FIBER, PREPARATION METHOD AND APPARATUS

CROSS-REFERENCE TO RELATED APPLICATIONS

This application claims priority to Chinese Patent Application No. 202211702421.X, filed on Dec. 29, 2022, the content of which is incorporated herein by reference in its entirety.

TECHNICAL FIELD

The application belongs to the field of preparing polyamide fibers, and specifically, relates to a high-elongation meta-aramid fiber, a preparation method and an apparatus.

BACKGROUND

According to their different molecular structures, aromatic polyamide fibers are mainly divided into the following two categories: meta (PMIA) and para (PPTA). Aramid fibers were successfully developed and industrialized by DuPont in the United States in the 1960s, and have developed rapidly since then. Para-aramid fibers are mainly used in personal protection, bulletproof armors, rubber articles, and high-strength cables. On the other hand, meta-aramid fibers have excellent properties such as high temperature resistance, flame retardancy, insulation, radiation resistance and chemical corrosion resistance or the like, and are widely used in high-temperature industrial protective clothing, electrical insulation, rubber articles, high-temperature insulation materials and high-temperature filtering and the like.

At present, the meta-aramid fibers are becoming more and more mature both in terms of research and development level and production scale, but there are still shortcomings in performance. At present, the elongation at break of the meta-aramid fibers produced in China is ≥ 25%, the elongation at break of the meta-aramid fibers produced by DuPont in the United States is about 45%, and the meta-aramid fibers produced by Teijin Corporation in Japan is about 36%. The elongation at break of these meta-aramid fibers is generally low relative to other fiber materials. On the one hand, this makes the fabrics made of these meta-aramid fibers less comfortable and cannot meet people's needs for comfort. On the other hand, the rubber products, the filter materials or the insulating materials filled with these meta-aramid fibers have lower hardness.

SUMMARY

Aiming at the problems existing in the prior art, the present application provides a high-elongation meta-aramid fiber, a preparation method and an apparatus. The elongation at break of the obtained meta-aramid fiber is 46% or more, and thus the elongation performance of the meta-aramid fiber is significantly improved.

The present application is achieved through the following technical solutions.

A preparation method of a high-elongation meta-aramid fiber comprises the steps of:

S1: adding isophthaloyl chloride to a first m-phenylenediamine solution and reacting at a stirring speed of 20-30 r/min to obtain a first reaction liquid, and then adjusting the pH of the first reaction liquid to 6.5-7.5 to obtain a first slurry, where the molar ratio of isophthaloyl chloride to m-phenylenediamine in the first m-phenylenediamine solution is (0.95-1.05):1;

adding a first part of isophthaloyl chloride to a second m-phenylenediamine solution and performing a first reaction at a stirring speed of 25-35 r/min to obtain a second reaction liquid; adjusting the pH of the second reaction liquid to 6.8-8 and then filtering insoluble matter to obtain a pre-polymerized slurry; adding an initiator and a second part of isophthaloyl chloride to the pre-polymerized slurry at a stirring speed of 25-35 r/min to perform a second reaction so as to obtain a third reaction liquid; adjusting the pH of the third reaction liquid to 7-8 to obtain a second slurry, where the mass ratio of the first part of isophthaloyl chloride to the second part of isophthaloyl chloride is (85.7-96):(4-14.3), and the molar ratio of the total amount of the first part of isophthaloyl chloride and the second part of isophthaloyl chloride to the m-phenylenediamine in the second m-phenylenediamine solution is (1-1.1):1;

S2: uniformly mixing the first slurry and the second slurry at a mass ratio of (3-7):(1-3) to obtain a mixed slurry;

S3: de-foaming the mixed slurry to obtain a spinning solution and producing the high-elongation meta-aramid fiber from the spinning solution through a wet spinning process.

Preferably, in S1, the first m-phenylenediamine solution and the second m-phenylenediamine solution are the same kind of solutions having the same solvents which are N,N'-dimethylformamide, N,N'-dimethylacetamide or N-methylpyrrolidone, and the mass fraction of m-phenylenediamine in the solutions is 7%-12%.

Preferably, in S1, the reaction for obtaining the first reaction liquid is performed at a reaction temperature of 5-20° C. for a reaction time of 0.5-2 h; the reaction for obtaining the second reaction liquid is performed at a reaction temperature of –4-10° C. for a reaction time of 0.5-1.5 h; and the reaction for obtaining the third reaction liquid is performed at a reaction temperature of 27-40° C. for a reaction time of 10-25 min.

Further, in S1, after reacting at a stirring speed of 20-30 r/min for 0.5-2 h, adding a polymerization stabilizer to terminate the reaction to obtain the first reaction liquid, and then adding methylamine, dimethylamine, ethylamine or diethylamine to adjust the pH of the first reaction liquid to 6.5-7.5;

adjusting the pH of the second reaction liquid to 6.8-8 by using ammonia gas, and after performing the second reaction at a stirring speed of 25-35 r/min for 10-25 min, adding a polymerization stabilizer to terminate the reaction to obtain the third reaction liquid, and then adding methylamine, dimethylamine, ethylamine or diethylamine to adjust the pH of the third reaction liquid to 7-8.

Further, in S1, the polymerization stabilizer is one or more selected from hydroquinone, p-tert-butylcatechol, 2,6-di-tert-butyl-p-cresol, propyl gallate, ethoxyquinoline, 2,6-di-tert-butyl p-cresol, bisphenol A, 4,4'-dihydroxybiphenyl, p-toluidine, diphenylamine, benzidine, p-phenylenediamine and N-nitrosodiphenylamine;

the initiator is cumene hydroperoxide, tert-butyl hydroperoxide, benzoyl peroxide, lauroyl peroxide, di-tert-butyl peroxide, dicumyl peroxide, diisopropyl peroxydicarbonate, dicyclohexyl peroxydicarbonate, a mixture a or a mixture b, where the mixture a is a mixture of cumene hydroperoxide and ferrous chloride, and the mixture b is a mixture of benzoyl peroxide and N,N-dimethylaniline;

in S1, the mass of the polymer stabilizer added after reacting at a stirring speed of 20-30 r/min for 0.5-2 h is 0.1%-0.8% of the mass of the m-phenylenediamine in the first m-phenylenediamine solution; the mass of the polymer stabilizer added after performing the second reaction at a stirring speed of 25-35 r/min for 10-25 min is 0.1%-0.2% of the mass of the m-phenylenediamine in the second m-phenylenediamine solution; and the mass of the initiator is 0.06%-0.35% of the mass of the m-phenylenediamine in the second m-phenylenediamine solution.

Preferably, in S1, the first slurry has a viscosity of 100-450 Po and a molecular weight of 5-10 W, and the second slurry has a viscosity of 1500-2500 Po and a molecular weight of 30-40 W.

Preferably, in S3, the spinning solution is firstly coagulated to obtain a primary fiber, and the primary fiber is sequentially subjected to stretching, water washing at 50-60° C., drying at 125-135° C., and heat-treating at 310-325° C. to obtain a shaped fiber, and the shaped fiber is oiled and curl formed to obtain the high-elongation meta-aramid fiber;

the coagulation bath used for coagulation is an aqueous solution of N,N'-dimethylformamide having a N,N'-dimethylformamide concentration of 56%-60% and a temperature of 9-11° C., and the stretching ratio is 0.8-1.1.

Further, the stretching is carried out for four times in a stretching bath which is an aqueous solution of N,N'-dimethylformamide, where the stretching bath for the first stretching has a concentration of 53%-44% and a temperature of 8-9° C., and the stretching ratio is 1.9-2.2; the stretching bath for the second stretching has a concentration of 51%-52.5% and a temperature of 9.2-10.5° C., and the stretching ratio is 1.2-1.4; the stretching bath for the third stretching has a concentration of 49.5%-50.5% and a temperature of 11-12° C., and the stretching ratio is 1.1-1.2; and the stretching bath for the fourth stretching has a concentration of 48.5%-49% and a temperature of 12-13.5° C., and the stretching ratio is 1.0-1.1.

A high-elongation meta-aramid fiber is obtained from the preparation method of a high-elongation meta-aramid fiber according to any one of the above.

An apparatus for preparing a spinning solution comprises: a first reactor for preparing a pre-polymerized slurry, a second reactor for preparing a second slurry, a third reactor for preparing a first slurry, and a fourth reactor for preparing a mixed slurry, where all of the first reactor, the second reactor, the third reactor and the fourth reactor are equipped with a stirring paddle, and a motor is connected to the top of the stirring paddle;

an outlet of the first reactor is in communication with an inlet of a first gear pump; an outlet of the first gear pump is in communication with an inlet of a plate-frame filter; an outlet of the plate-frame filter is in communication with an inlet of the second reactor; an outlet of the second reactor is in communication with an inlet of a second gear pump; an outlet of the second gear pump is in communication with an first inlet of the fourth reactor; an outlet of the third reactor is in communication with an inlet of a third gear pump; and an outlet of the third gear pump is in communication with an second inlet of the fourth reactor;

an outlet of the fourth reactor is in communication with an inlet of a first metering pump; an outlet of the first metering pump is in communication with an inlet of a degassing tower; an outlet of the degassing tower is in communication with an inlet of a second metering pump; and an outlet of the second metering pump is used to be connected to an inlet of a spinning port.

Compared with the prior art, the present application has the following beneficial technical effects.

In the preparation method of the high-elongation meta-aramid fiber according to the present application, in order to improve the performance of the elongation at break performance of the meta-aramid fiber, a slurry having low viscosity and low molecular weight and a slurry having high viscosity and high molecular weight are respectively prepared. First, by controlling the ratio of isophthaloyl chloride to m-phenylenediamine in the first m-phenylenediamine solution and the stirring speed, the slurry having low molecular weight and low viscosity is obtained. If the stirring speed is too slow, the molecular weight will be too large and the molecular weight distribution range will be too large. Stirring too fast tends to form too many small molecule polymers. In addition, the slurry having high molecular weight can be obtained by controlling the ratio of m-phenylenediamine in the m-phenylenediamine solution to the first part of isophthaloyl chloride and the stirring speed. The initiator activates the activity of the prepolymer for post-condensation polymerization. By controlling the molar ratio of the total amount of both parts of isophthaloyl chloride to the m-phenylenediamine in the m-phenylenediamine solution, the mass ratio of both parts of isophthaloyl chloride and the stirring speed, the slurry having high viscosity can be obtained. In the high-elongation meta-aramid fiber, the long-chain molecules and the short-chain molecules are cross-laminated and connected by molecular chains. By preparing the mixed slurry and adjusting the spinning process, the present application prepares a high-elongation meta-aramid fiber having an elongation at break of 46% or more, a breaking strength of 4.6 cN/dtex or more, whose elongation performance is significantly improved. The fabrics made of these meta-aramid fibers have better comfortability and can meet people's needs for comfort. In addition, the rubber products, the filtering materials or the insulating materials filled with these meta-aramid fibers have higher hardness, which can meet the requirements for application.

In the apparatus for preparing the spinning solution in the preparation method of a high-elongation meta-aramid fiber according to the application, after the motor is connected to the upper part of the stirring paddle, the stirring in the first reactor, the second reactor and the third reactor and the mixing in the fourth reactor are facilitated. After the pre-polymerization slurry is prepared in the first reactor, the first gear pump can transport the pre-polymerization slurry to the plate-frame filter to filter the insoluble matter. The neutralized slurry can be further transported to the second reactor. After the second slurry is prepared in the second reactor, the second gear pump can transport the second slurry to the fourth reactor. After the first slurry is prepared in the third reactor, the third gear pump can transport the first slurry to the fourth reactor. The flow rate of the mixed slurry entering the degassing tower is monitored by the first metering pump, and the spinning solution obtained after degassing can enter the second metering pump. Whether the spinning solution obtained after degassing stays in the degassing tower can be determined by comparing the flow rates on the first metering pump and the second metering pump. After that, the spinning solution can enter the wet spinning process, and finally the high-elongation meta-aramid fiber can be achieved.

DETAILED DESCRIPTION OF THE EMBODIMENTS

Figure 1:
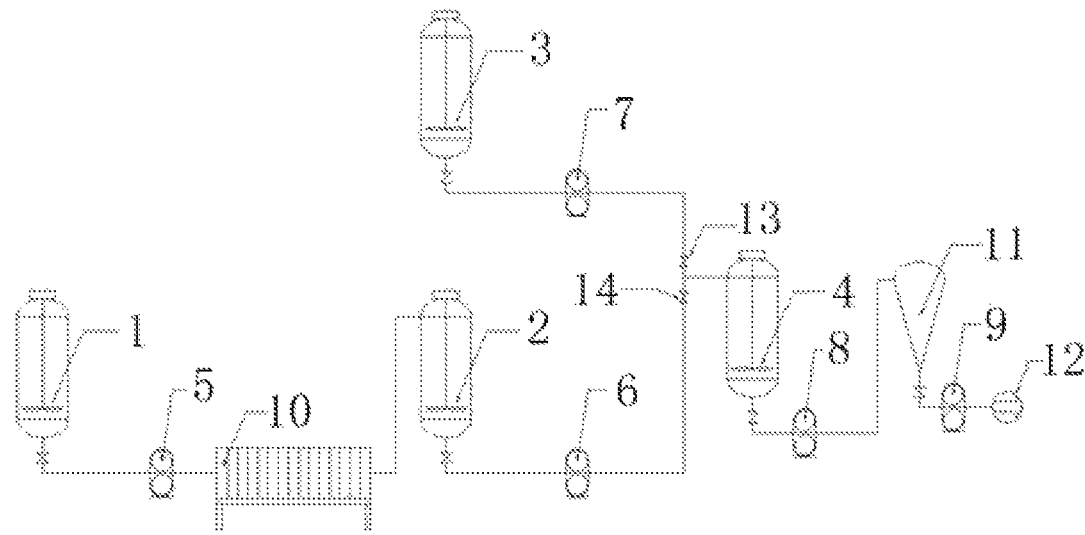
FIG. 1 shows a schematic structural view of the apparatus of the present application.

The present application will be further described in detail below in conjunction with specific examples, which are explanations of the present application rather than limitations.

The application provides a preparation method of a high-elongation meta-aramid fiber, which specifically comprises the following steps of:

Step (1): M-phenylenediamine is dissolved in a polar organic solvent to prepare a m-phenylenediamine solution with a mass fraction of 7%-12%, that is, m-phenylenediamine accounts for 7%-12% of the entire mass of the solution.

The polar organic solvent is N,N'-dimethylformamide (DMAc), N,N'-dimethylacetamide or N-methylpyrrolidone.

Step (2): Isophthaloyl dichloride is added to the m-phenylenediamine solution prepared in step (1) at one time. The mass ratio of m-phenylenediamine in the m-phenylenediamine solution to isophthaloyl chloride is 1: (0.95-1.05). The reaction is performed for 0.5-2 h at a stirring rate of 20-30 r/min. If the stirring speed is too slow, the molecular weight will be too large and the molecular weight distribution range will be too large. Stirring too fast tends to form too many small molecule polymers. After that, a polymerization stabilizer is added to terminate the reaction. The mass of the polymerization stabilizer is 0.1%-0.8% of m-phenylenediamine. The viscosity of the slurry no longer changes. The temperature of the whole process is controlled at 5-20° C. Finally, an organic base is added to adjust the pH of the resulting slurry to 6.5-7.5. The organic base is methylamine, dimethylamine, ethylamine or diethylamine. Thus, a first slurry having a viscosity of 100-450 Poise (Po) and a molecular weight of 5-10 W can be achieved.

The polymerization stabilizer is one or more selected from hydroquinone, p-tert-butylcatechol, 2,6-di-tert-butyl-p-cresol, propyl gallate, ethoxyquinoline, 2,6-di-tert-butyl-p-cresol, bisphenol A. 4,4'-dihydroxybiphenyl, p-toluidine, diphenylamine, benzidine, p-phenylenediamine and N-nitrosodiphenylamine. There is no limit to the ratio of two or more reagents mixed.

Step (3): The ratio of m-phenylenediamine in the m-phenylenediamine solution prepared in step (1) to the total amount of isophthaloyl chloride to be added is 1: (1-1.1). Firstly, isophthaloyl chloride comprising 85.7% to 96% of the total mass of isophthaloyl chloride is added to the m-phenylenediamine solution prepared in step (1). A polymerization reaction is carried out at a stirring rate of 25-35 r/min for 0.5-1.5 h. If the stirring is too fast or too slow, the molecular chain length of the oligomers generated by the pre-polymerization reaction may be uneven, which will affect the polymerization during the subsequent reaction, thus making the molecular weight distribution of the final polymer wider. The temperature is kept at −4-10° C., and then ammonia gas is added for neutralization to pH 6.8-8. Ammonium chloride is removed by filtration to obtain a pre-polymerized slurry. At a stirring speed of 25-35 r/min, an initiator with a content of 0.06% to 0.35% of the mass of m-phenylenediamine and the remaining isophthaloyl chloride are added to the pre-polymerized slurry. The reaction temperature is kept at 27-40° C. to carry out the reaction for 10-25 min and then the viscosity can reach 1500-2500 Po. Then, the same polymerization stabilizer as that in step (2) with a content of 0.1% to 0.2% by mass of m-phenylenediamine is added to terminate the reaction. Then, an organic base is added for secondary neutralization to a pH of 7-8. The organic base is methylamine, dimethylamine, ethylamine or diethylamine. A second slurry having a viscosity of 1500-2500 Po and a molecular weight of 30-40 W can be obtained.

In the above-mentioned pre-polymerization reaction, m-phenylenediamine and isophthaloyl chloride first react to form a prepolymer, and then ammonia gas is added to neutralize the hydrochloric acid produced during this process so as to generate a solid ammonium chloride. After filtering out the insoluble ammonium chloride, an initiator is added to activate the activity of the prepolymer. After adding isophthaloyl chloride to finish the polycondensation reaction and waiting for the viscosity to meet the requirements, a polymerization stabilizer is added to terminate the reaction. Then, an organic base is added to neutralize hydrochloric acid produced in the post-polymerization.

The initiator include cumene hydroperoxide, tert-butyl hydroperoxide, a mixture of cumene hydroperoxide and ferrous chloride, a mixture of benzoyl peroxide and N,N-dimethylaniline, peroxide benzoyl, lauroyl peroxide, di-tert-butyl peroxide, dicumyl peroxide, diisopropyl peroxydicarbonate, or dicyclohexyl peroxydicarbonate. The mixture of cumene hydroperoxide and ferrous chloride, and the mixture of benzoyl peroxide and N,N-dimethylaniline are more suitable for post-polymerization. There is no limit to the ratio thereof when they are mixed, and the triggering conditions are relatively mild.

Step (4): The first slurry and the second slurry are stirred at a mass ratio of (3-7):(1-3) until uniform to obtain a mixed slurry with a solid content of 15%~24%, where the molecular weight in the first slurry is relatively high, the second slurry with relatively high viscosity and molecular weight is mixed; when the molecular weight in the first slurry is relatively low, the second slurry with slightly lower viscosity and molecular weight is mixed.

Figure 2:
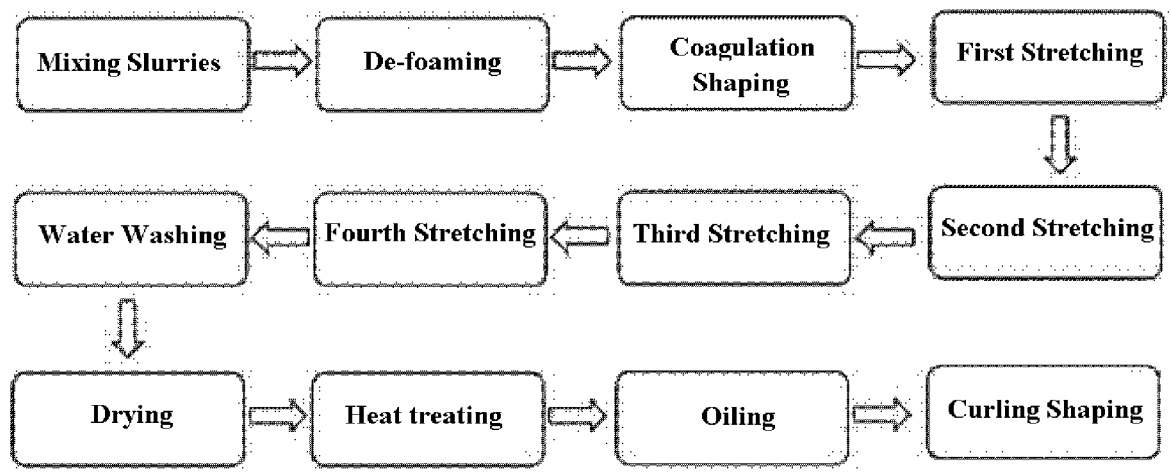
FIG. 2 shows a process flow diagram of obtaining the high-elongation meta-aramid fiber from a mixed pulp in the method of the present application.

Step (5): As shown in FIG. 2, the mixed slurry (that is, a spinning stock solution) is defoamed to obtain a spinning solution. The spinning solution is used to obtain a high-elongation meta-aramid fiber through a wet spinning process.

Specifically, the spinning solution is transported to a spinning port through a metering pump, and enters the coagulation forming process through the spinning port to obtain a primary fiber. The primary fiber is stretched, washed, dried, and heat-treated to obtain a shaped fiber. After the shaped fiber is oiled and crimped, a high-elongation meta-aramid fiber is obtained.

Here, the coagulation forming process is realized by a coagulation bath. The coagulation bath is an aqueous solution of N,N'-dimethylformamide (DMAc) having a DMAc concentration of 56%-60% at a temperature of 9-11° C., and the stretching ratio is 0.8-1.1.

The stretching is carried out for four times. The stretching bath is also an aqueous solution of N,N'-dimethylformamide (DMAc). For the first stretching, the stretching bath has a concentration of 53%-55% at a temperature of 8-9° C., and the stretching ratio is 1.9-2.2; for the second stretching, the stretching bath has a concentration of 51%-52.5% at a temperature of 9.2-10.5° C., and the stretching ratio is 1.2-1.4; for the third stretching, the stretching bath has a concentration of 49.5%-50.5% at a temperature of 11-12° C., and the stretching ratio is 1.1-1.2; and for the fourth stretching, the stretching bath has a concentration of 48.5%-49% at a temperature of 12-13.5° C., and the stretching ratio is 1.0-1.1.

The water temperature during washing is 50-60° C. The drying temperature is 125-135° C. The heat treatment temperature is 310-325° C.

Figure 7:
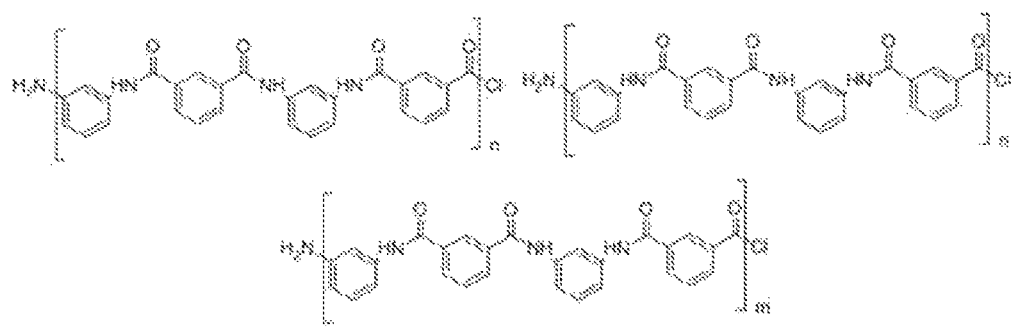
FIG. 7 shows the structural formula of the high-elongation meta-aramid fiber of the present application.

The structural formula of the above-mentioned high-elongation meta-aramid fiber is shown in FIG. 7, where the polymeric structural units are the same but m≠n; 421≥n≥210; 1681≥m≥1260. m and n are respectively determined by the second slurry and the first slurry in the mixed slurry. m is a long-chain molecule, and n is a short-chain molecule. They are mixed together similar to cross-stacking, relying on the molecular chain connections without chemical reactions. Since n is a short-chain molecule, the number of its layers is twice that of long-chain molecules. The ratio of the difference between the elongation length of the meta-aramid fiber when it is stretched to break and the length before stretching to the length before stretching is called "elongation at break", expressed by e, and the unit thereof is percentage (%). The elongation at break can represent the elongation deformation ability of the meta-aramid fiber under the maximum load. That is, $e=(La-L0)/L0$, where e is the elongation at break, L0 is the length of the meta-aramid fiber before stretching, and La is the elongation length of the meta-aramid fiber when it is stretched to break.

The meta-aramid fiber having high elongation at break has a relatively soft hand feeling, can buffer the force it receives during textile processing, and has less wool and broken ends.

In the present application, when realizing the above process, it is necessary to improve the apparatus for preparing the spinning solution, as shown in FIG. 1. Additionally, the follow-up wet spinning process has an existing set of devices. The apparatus for preparing the spinning solution according to the present application mainly includes: a first reactor 1 capable of preparing a pre-polymerized slurry, a second reactor 2 capable of preparing a second slurry, a third reactor 3 capable of preparing a first slurry, and a fourth reactor 4 capable of preparing a mixed slurry. Such reactors are all located on the same floor and mounted vertically by some existing supports. They are shown separately in the figure for convenience only. At different positions on the upper part of the side of the first reaction kettle 1, there are provided pipes that allow the m-phenylenediamine solution, isophthaloyl chloride and ammonia to enter respectively. At different positions on the upper part of the side of the second reactor 2, there are provided pipes that allow the pre-polymerized slurry, the initiator, isophthaloyl chloride, the polymerization stabilizer and the organic base to enter respectively. At different positions on the upper part of the side of the third reactor 3, there provided pipes that allow the m-phenylenediamine solution, isophthaloyl chloride, the polymerization stabilizer and the organic base to enter respectively. Jackets are installed on the outside of the first reactor 1, the second reactor 2 and the third reactor 3. By introducing steam, hot water or hot oil to heat the corresponding materials, or cooling the corresponding materials by cooling water, the temperatures in the first reactor 1, the second reactor 2 and the third reactor 3 are respectively controlled to be −4-10° C., 27-40° C. and 5-20° C. At different positions on the upper part of the side of the fourth reactor 4, there are provided pipes that allow the first slurry and the second slurry to enter. These pipes are conventional and not shown. The first reactor 1, the second reactor 2, the third reactor 3 and the fourth reactor 4 are installed at the upper parts thereof with a stirring paddle whose upper part is connected to a motor for convenient stirring.

The outlet at the lower end of the first reactor 1 is in communication with the inlet of the first gear pump 5. The outlet of the first gear pump 5 is in communication with the inlet of the plate-frame filter 10. In this way, after the pre-polymerized slurry is prepared in the first reactor 1, the first gear pump 5 can deliver the pre-polymerized slurry to the plate-frame filter 10, and then filter out ammonium chloride, which is convenient for ammonium chloride to be recycled. The outlet of the plate-frame filter 10 is in communication with the inlet of the second reactor 2. In this way, the neutralized slurry can be further transported to the second reactor 2. The outlet of the second reactor 2 is in communication with the inlet of the second gear pump 6. The outlet of the second gear pump 6 is in communication with the first inlet of the fourth reactor 4. After the second slurry is prepared in the second reactor 2, the second gear pump 6 can transport the second slurry to the fourth reactor 4. A second solenoid valve 14 is installed on the pipeline connecting the second gear pump 6 and the fourth reactor 4. The second solenoid valve 14 can control the flow rate of the second slurry into the fourth reactor 4.

The outlet of the second reactor 3 is in communication with the inlet of the third gear pump 7. The outlet of the third gear pump 7 is in communication with the second inlet of the fourth reactor 4. In this way, after the first slurry is prepared in the third reactor 3, the third gear pump 7 can transport the first slurry to the fourth reactor 4. A first electromagnetic valve 13 is installed on the pipeline connecting the third gear pump 7 and the fourth reactor 4. The first electromagnetic valve 13 can control the flow rate of the first slurry entering the fourth reactor 4.

The outlet of the fourth reactor 4 is in communication with the inlet of the first metering pump 8. The outlet of the first metering pump 8 is in communication with the inlet of the degassing tower 11. In this way, the flow rate of the mixed slurry entering the degassing tower 11 can be monitored by the first metering pump 8. The outlet of the degassing tower 11 is in communication with the inlet of the second metering pump 9. The spinning solution obtained after de-foaming can enter the second metering pump 9. Whether the spinning solution obtained after degassing stays in the degassing tower 11 can be determined by comparing the flow rates on the first metering pump 8 and the second metering pump 9. The outlet of the second metering pump 9 is in communication with the inlet of the spinning port 12. In this way, the spinning solution can enter the wet spinning process. Finally, the high-elongation meta-aramid fiber can be obtained.

The following 5 examples are listed for specific description, and the parts involved are all parts by mole.

Example 1

The preparation method of the high elongation meta-aramid fiber according to the present application was performed, which specifically comprised the following steps.

Step 1: 1 part of m-phenylenediamine was dissolved in 11.16 parts of DMAc to prepare a m-phenylenediamine solution. At this time, the mass fraction of the m-phenylenediamine solution was 10%. Then, the temperature of the m-phenylenediamine solution was adjusted to 8° C., and 1.01 parts of isophthaloyl chloride was added thereto. After stirring at a rate of 30 r/min for 0.6 h, a total of 8.5×10-3 parts of hydroquinone and diphenylamine were added to terminate the reaction. The total mass of hydroquinone and diphenylamine was 0.109% of m-phenylenediamine. The molar ratio of hydroquinone to diphenylamine was 1:1, and the corresponding mass ratio was 11:17. The temperature of the whole process was controlled at 5-20° C. Diethylamine was then added to adjust the pH of the slurry to 7.1 to obtain a first slurry with a viscosity of 178 Po and a molecular weight of 5.7×104.

Step 2: 1 part of m-phenylenediamine was dissolved in 11.16 parts of DMAc to prepare a m-phenylenediamine solution. Then the temperature of m-phenylenediamine solution was adjusted to −1° C. Then 0.9 parts of isophthaloyl dichloride were added. The reaction was carried out for 1 h under stirring at a rate of 35 r/min, and the temperature was kept at −4-10° C. Ammonia gas was then added for neutralization and the pH was adjusted to 6.8. After removing ammonium chloride by filtration, at a stirring speed of 35 r/min, 5.2×10-5 parts of benzoyl peroxide and N,N-dimethylaniline, and 0.15 parts of isophthaloyl dichloride were added to the pre-polymerized slurry. The total mass of benzoyl peroxide and N,N-dimethylaniline is 0.0775% of the mass of m-phenylenediamine. The molar ratio of benzoyl peroxide and N,N-dimethylaniline was 1:2, and the corresponding mass ratio was 1:1. The reaction was kept at 28° ° C. for 15 minutes, and the viscosity was 1900Po at this time. Then 8.5×10-3 parts of hydroquinone and diphenylamine were added. The total mass of hydroquinone and diphenylamine was 0.109% of m-phenylenediamine. The molar ratio of hydroquinone to diphenylamine was 1:1. After adding diethylamine to adjust the pH of the resulting slurry to 7.3, a second slurry with a viscosity of 1900 Po and a molecular weight of 3.8×105 was obtained.

Step 3: The first slurry and the second slurry were stirred and mixed at a mass ratio of 4:1, and the solid content thereof after mixing was 20%. The mixed slurry is delivered to the spinning port 12 through the second metering pump 9 after defoaming. The mixed slurry was subjected to the following treatments: stretching for 0.95 times in a coagulation bath with a DMAc concentration of 59% at 10° C.; first stretching for 2.15 times in a stretching bath with a DMAc concentration of 54% at a temperature of 8.5° C.; second stretching for 1.25 times in a stretching bath with a DMAc concentration of 52% at a temperature of 10° C.; third stretching for 1.15 times in a stretching bath with a DMAc concentration of 50% at a temperature of 11.5° C.; and fourth stretching for 1.05 times in a stretching bath with a DMAc concentration of 48.7% at a temperature of 12° C. The water washing temperature was 57° C. The drying temperature was 132° ° C. The heat treatment temperature was 323° C. Shaped fiber was obtained after heat treatment. A high-elongation meta-aramid fiber was obtained after the shaped fiber was oiled and crimped.

Fiber index: the fineness was 1.66 dtex; the force value was 7.66 cN; the elongation at break was 47%; the breaking strength was 4.61 cN/dtex; the modulus was 74.51 cN/dtex.

Example 2

The preparation method of the high elongation meta-aramid fiber according to the present application was performed, which specifically comprised the following steps.

Step 1: 1 part of m-phenylenediamine was dissolved in 9 parts of DMAc to prepare a m-phenylenediamine solution. At this time, the mass fraction of the m-phenylenediamine solution was 12%. Then, the temperature of the m-phenylenediamine solution was adjusted to 15° C., and 0.98 parts of isophthaloyl chloride was added thereto. After stirring at a rate of 20 r/min for 0.5 h, a total of 1.8×10-2 parts of hydroquinone and diphenylamine were added to terminate the reaction. The total mass of hydroquinone and diphenylamine was 0.218% of m-phenylenediamine. The molar ratio of hydroquinone to diphenylamine was 1:1. The temperature of the whole process was controlled at 5-20° C. Diethylamine was then added to adjust the pH of the slurry to 7.4 to obtain a first slurry with a viscosity of 244 Po and a molecular weight of 7.7×104.

Step 2: 1 part of m-phenylenediamine was dissolved in 7.92 parts of DMAc to prepare a m-phenylenediamine solution. Then the temperature of m-phenylenediamine solution was adjusted to −2° C. Then 0.94 parts of isophthaloyl dichloride were added. The reaction was carried out for 1.4 h under stirring at a rate of 30 r/min, and the temperature was kept at −4-10° C. Ammonia gas was then added for neutralization and the pH was adjusted to 7.1. After removing ammonium chloride by filtration, at a stirring speed of 30 r/min, 1.04×10-4 parts of benzoyl peroxide and N,N-dimethylaniline, and 0.06 parts of isophthaloyl dichloride were added to the pre-polymerized slurry. The total mass of benzoyl peroxide and N,N-dimethylaniline is 0.155% of the mass of m-phenylenediamine. The molar ratio of benzoyl peroxide and N,N-dimethylaniline was 1:2. The reaction was kept at 35° C. for 10 minutes, and the viscosity was 2300Po at this time. Then 1.55×10-2 parts of hydroquinone and diphenylamine were added. The total mass of hydroquinone and diphenylamine was 0.2% of m-phenylenediamine. The molar ratio of hydroquinone to diphenylamine was 1:1. After adding diethylamine to adjust the pH of the resulting slurry to 7.5, a second slurry with a viscosity of 2300 Po and a molecular weight of 3.5×105 was obtained.

Step 3: The first slurry and the second slurry were stirred and mixed at a mass ratio of 4:1, and the solid content thereof after mixing was 18%. The mixed slurry is delivered to the spinning port 12 through the second metering pump 9 after defoaming. The mixed slurry was subjected to the following treatments: stretching for 1.05 times in a coagulation bath with a DMAc concentration of 60% at 11° C.; first stretching for 1.9 times in a stretching bath with a DMAc concentration of 53% at a temperature of 9° C.; second stretching for 1.4 times in a stretching bath with a DMAc concentration of 52.5% at a temperature of 10.5° C.; third stretching for 1.2 times in a stretching bath with a DMAc concentration of 50.5% at a temperature of 12° C.; and fourth stretching for 1.1 times in a stretching bath with a DMAc concentration of 49% at a temperature of 12.5° C. The water washing temperature was 60° C. The drying temperature was 130° C. The heat treatment temperature was 320° C. Shaped fiber was obtained after heat treatment. A high-elongation meta-aramid fiber was obtained after the shaped fiber was oiled and crimped.

Fiber index: the fineness was 1.54 dtex; the force value was 7.33 cN; the elongation at break was 48.5%; the breaking strength was 4.76 cN/dtex; the modulus was 76.93 cN/dtex.

Example 3

The preparation method of the high elongation meta-aramid fiber according to the present application was performed, which specifically comprised the following steps.

Step 1: 1 part of m-phenylenediamine was dissolved in 13.41 parts of DMAc to prepare a m-phenylenediamine solution. At this time, the mass fraction of the m-phenylenediamine solution was 8.47%. Then, the temperature of the m-phenylenediamine solution was adjusted to 20° C., and 1.04 parts of isophthaloyl chloride was added thereto. After stirring at a rate of 25 r/min for 1.2 h, a total of $2.5 \times 10^{-2}$ parts of hydroquinone and diphenylamine were added to terminate the reaction. The total mass of hydroquinone and diphenylamine was 0.32% of m-phenylenediamine. The molar ratio of hydroquinone to diphenylamine was 1:1. The temperature of the whole process was controlled at 5-20° C. Diethylamine was then added to adjust the pH of the slurry to 7.5 to obtain a first slurry with a viscosity of 400 Po and a molecular weight of $8.7 \times 10^4$.

Step 2: 1 part of m-phenylenediamine was dissolved in 13.41 parts of DMAc to prepare a m-phenylenediamine solution. Then the temperature of m-phenylenediamine solution was adjusted to 9° C. Then 0.88 parts of isophthaloyl dichloride were added. The reaction was carried out for 1 h under stirring at a rate of 25 r/min, and the temperature was kept at −4-10° C. Ammonia gas was then added for neutralization and the pH was adjusted to 7.3. After removing ammonium chloride by filtration, at a stirring speed of 25 r/min, $2.04 \times 10^{-4}$ parts of benzoyl peroxide and N,N-dimethylaniline, and 0.12 parts of isophthaloyl dichloride were added to the pre-polymerized slurry. The total mass of benzoyl peroxide and N,N-dimethylaniline is 0.304% of the mass of m-phenylenediamine. The molar ratio of benzoyl peroxide and N,N-dimethylaniline was 1:2. The reaction was kept at 38° C. for 15 minutes, and the viscosity was 1900Po at this time. Then $8.5 \times 10^{-3}$ parts of hydroquinone and diphenylamine were added. The total mass of hydroquinone and diphenylamine was 0.109% of m-phenylenediamine. The molar ratio of hydroquinone to diphenylamine was 1:1. After adding diethylamine to adjust the pH of the resulting slurry to 7.2, a second slurry with a viscosity of 1900 Po and a molecular weight of $3.4 \times 10^5$ was obtained.

Step 3: The first slurry and the second slurry were stirred and mixed at a mass ratio of 7:3, and the solid content thereof after mixing was 19%. The mixed slurry is delivered to the spinning port 12 through the second metering pump 9 after defoaming. The mixed slurry was subjected to the following treatments: stretching for 0.99 times in a coagulation bath with a DMAc concentration of 57% at 9.3° C.; first stretching for 2.1 times in a stretching bath with a DMAc concentration of 54.5% at a temperature of 8.9° C.; second stretching for 1.32 times in a stretching bath with a DMAc concentration of 52.3% at a temperature of 9.2° C.; third stretching for 1.14 times in a stretching bath with a DMAc concentration of 50.3% at a temperature of 11.1° C.; and fourth stretching for 1.01 times in a stretching bath with a DMAc concentration of 48.5% at a temperature of 13.1° C. The water washing temperature was 57° C. The drying temperature was 134° C. The heat treatment temperature was 324° C. Shaped fiber was obtained after heat treatment. A high-elongation meta-aramid fiber was obtained after the shaped fiber was oiled and crimped.

Fiber index: the fineness was 1.48 dtex; the force value was 7.45 cN; the elongation at break was 46.7%; the breaking strength was 5.03 cN/dtex; the modulus was 81.35 cN/dtex.

Example 4

The preparation method of the high elongation meta-aramid fiber according to the present application was performed, which specifically comprised the following steps.

Step 1: 1 part of m-phenylenediamine was dissolved in 12.07 parts of DMAc to prepare a m-phenylenediamine solution. At this time, the mass fraction of the m-phenylenediamine solution was 9.36%. Then, the temperature of the m-phenylenediamine solution was adjusted to 13° C., and 1.01 parts of isophthaloyl chloride was added thereto. After stirring at a rate of 26 r/min for 0.8 h, a total of $9.7 \times 10^{-3}$ parts of hydroquinone and diphenylamine were added to terminate the reaction. The total mass of hydroquinone and diphenylamine was 0.124% of m-phenylenediamine. The molar ratio of hydroquinone to diphenylamine was 1:1. The temperature of the whole process was controlled at 5-20° C. Diethylamine was then added to adjust the pH of the slurry to 6.7 to obtain a first slurry with a viscosity of 386 Po and a molecular weight of $7.2 \times 10^4$.

Step 2: 1 part of m-phenylenediamine was dissolved in 12.06 parts of DMAc to prepare a m-phenylenediamine solution. Then the temperature of m-phenylenediamine solution was adjusted to 5° C. Then 0.91 parts of isophthaloyl dichloride were added. The reaction was carried out for 0.6 h under stirring at a rate of 28 r/min, and the temperature was kept at −4-10° C. Ammonia gas was then added for neutralization and the pH was adjusted to 6.8. After removing ammonium chloride by filtration, at a stirring speed of 28 r/min, $1.36 \times 10^{-4}$ parts of benzoyl peroxide and N,N-dimethylaniline, and 0.09 parts of isophthaloyl dichloride were added to the pre-polymerized slurry. The total mass of benzoyl peroxide and N,N-dimethylaniline is 0.203% of the mass of m-phenylenediamine. The molar ratio of benzoyl peroxide and N,N-dimethylaniline was 1:2, and the corresponding mass ratio was 1:1. The reaction was kept at 31° C. for 13 minutes, and the viscosity was 2100 Po at this time. Then $1.4 \times 10^{-2}$ parts of hydroquinone and diphenylamine were added. The total mass of hydroquinone and diphenylamine was 0.179% of m-phenylenediamine. The molar ratio of hydroquinone to diphenylamine was 1:1. After adding diethylamine to adjust the pH of the resulting slurry to 7.5, a second slurry with a viscosity of 2100 Po and a molecular weight of $3.7 \times 10^5$ was obtained.

Step 3: The first slurry and the second slurry were stirred and mixed at a mass ratio of 5:1, and the solid content thereof after mixing was 20%. The mixed slurry is delivered to the spinning port 12 through the second metering pump 9 after defoaming. The mixed slurry was subjected to the following treatments: stretching for 1.02 times in a coagulation bath with a DMAc concentration of 58% at 9.8° C.; first stretching for 1.97 times in a stretching bath with a DMAc concentration of 53.7% at a temperature of 8.1° C.; second stretching for 1.21 times in a stretching bath with a DMAc concentration of 51.2% at a temperature of 10° C.; third stretching for 1.17 times in a stretching bath with a DMAc concentration of 49.6% at a temperature of 11.9° C.; and fourth stretching for 1.08 times in a stretching bath with a DMAc concentration of 48.8% at a temperature of 12.7° C. The water washing temperature was 59° ° C. The drying temperature was 127° ° C. The heat treatment temperature was 313° ° C. Shaped fiber was obtained after heat treatment. A high-elongation meta-aramid fiber was obtained after the shaped fiber was oiled and crimped.

Fiber index: the fineness was 1.61 dtex; the force value was 7.72 cN; the elongation at break was 47.7%; the breaking strength was 4.79 cN/dtex; the modulus was 75.09 cN/dtex.

Example 5

The preparation method of the high elongation meta-aramid fiber according to the present application was performed, which specifically comprised the following steps.

Step 1: 1 part of m-phenylenediamine was dissolved in 13.41 parts of DMAc to prepare a m-phenylenediamine solution. At this time, the mass fraction of the m-phenylenediamine solution was 8.47%. Then, the temperature of the m-phenylenediamine solution was adjusted to 13° C., and 0.95 parts of isophthaloyl chloride was added thereto. After stirring at a rate of 26 r/min for 2 h, a total of 2.2×10-2 parts of hydroquinone and diphenylamine were added to terminate the reaction. The total mass of hydroquinone and diphenylamine was 0.282% of m-phenylenediamine. The molar ratio of hydroquinone to diphenylamine was 1:1. The temperature of the whole process was controlled at 5-20° C. Diethylamine was then added to adjust the pH of the slurry to 6.5 to obtain a first slurry with a viscosity of 250 Po and a molecular weight of 5.1×104.

Step 2: 1 part of m-phenylenediamine was dissolved in 13.41 parts of DMAc to prepare a m-phenylenediamine solution. Then the temperature of m-phenylenediamine solution was adjusted to −4° C. Then 0.87 parts of isophthaloyl dichloride were added. The reaction was carried out for 0.5 h under stirring at a rate of 28 r/min, and the temperature was kept at −4-10° C. Ammonia gas was then added for neutralization and the pH was adjusted to 7.3. After removing ammonium chloride by filtration, at a stirring speed of 28 r/min, 2.01×10-4 parts of benzoyl peroxide and N,N-dimethylaniline, and 0.13 parts of isophthaloyl dichloride were added to the pre-polymerized slurry. The total mass of benzoyl peroxide and N, N-dimethylaniline is 0.299% of the mass of m-phenylenediamine. The molar ratio of benzoyl peroxide and N,N-dimethylaniline was 1:2. The reaction was kept at 40° ° C. for 10 minutes, and the viscosity was 2400Po at this time. Then 1.45×10-2 parts of hydroquinone and diphenylamine were added. The total mass of hydroquinone and diphenylamine was 0.186% of m-phenylenediamine. The molar ratio of hydroquinone to diphenylamine was 1:1. After adding diethylamine to adjust the pH of the resulting slurry to 7.5, a second slurry with a viscosity of 2400 Po and a molecular weight of 3.1×105 was obtained.

Step 3: The first slurry and the second slurry were stirred and mixed at a mass ratio of 7:3, and the solid content thereof after mixing was 19.5%. The mixed slurry is delivered to the spinning port 12 through the second metering pump 9 after defoaming. The mixed slurry was subjected to the following treatments: stretching for 0.99 times in a coagulation bath with a DMAc concentration of 57% at 9.3° C.; first stretching for 2.1 times in a stretching bath with a DMAc concentration of 54.5% at a temperature of 8.9° C.; second stretching for 1.32 times in a stretching bath with a DMAc concentration of 52.3% at a temperature of 9.2° C.; third stretching for 1.14 times in a stretching bath with a DMAc concentration of 50.3% at a temperature of 11.1° C.; and fourth stretching for 1.01 times in a stretching bath with a DMAc concentration of 48.5% at a temperature of 13.1° C. The water washing temperature was 57° C. The drying temperature was 134° C. The heat treatment temperature was 324° C. Shaped fiber was obtained after heat treatment. A high-elongation meta-aramid fiber was obtained after the shaped fiber was oiled and crimped.

Fiber index: the fineness was 1.53 dtex; the force value was 7.85 cN; the elongation at break was 47.8%; the breaking strength was 5.13 cN/dtex; the modulus was 80.35 cN/dtex.

Comparative Example

The preparation method of a meta-aramid fiber according to the present application was performed, which specifically comprised the following steps.

Step 1: 1 part of m-phenylenediamine was dissolved in 11.16 parts of DMAc to prepare a m-phenylenediamine solution. Then, the temperature of the m-phenylenediamine solution was adjusted to −3° C., and 0.93 parts of isophthaloyl chloride was added thereto. The mixture was stirred for 2 h at a rate of 25 r/min. Then, the pH of the mixture was neutralized to 7.3 with ammonia gas. After filtering the ammonium chloride, 0.07 part of isophthaloyl chloride was added. After stirring at a speed of 25 r/min for 0.5 h, diethylamine was used to neutralize the pH to 7.2. The viscosity of the resultant was 700 Po and the molecular weight was 2.1×105.

Step 2: The mixture was subjected to the following treatments to obtain a shaped fiber: stretching for 0.99 times in a coagulation bath with a DMAc concentration of 59% at 9.8° C.; stretching for 3.1 times in a stretching bath with a DMAc concentration of 53.7% at a temperature of 17° C.; water washing in deionized water at 69° C.; drying treatment at a temperature of 127° ° C.; and heat treatment at a temperature of 313° C. A meta-aramid fiber was obtained after the shaped fiber was oiled and crimped.

Fiber index: the fineness was 1.72 dtex; the force value was 6.57 cN; the elongation at break was 28.07%; the breaking strength was 3.83 cN/dtex; the modulus was 60.76 cN/dtex.

Figure 3:
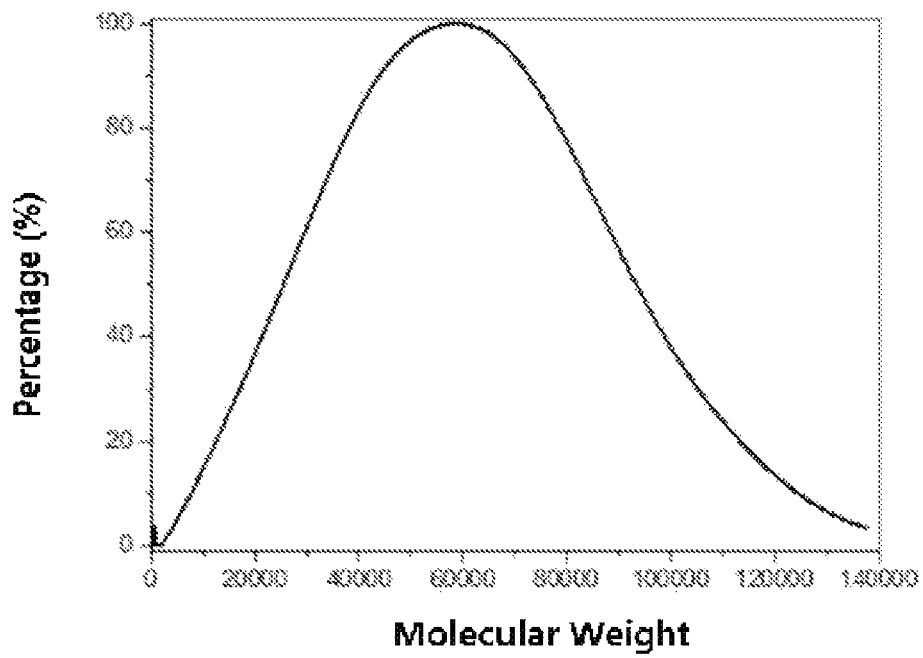
FIG. 3 shows the molecular weight distribution curve of the first slurry obtained in Example 5 of the present application.

As shown in FIG. 3, the weight average molecular weight of the first slurry is 5.1 W. The weight average molecular weight of 5.1 W is about 99%, which indicates that the molecular weight in the first slurry is mainly concentrated at 5.1 W. The percentage of the molecular weight range from 3.9 W to 7.9 W is 80% or more, which indicates that the process is stably controlled so that the first slurry mainly comprises short molecular chains.

Figure 4:
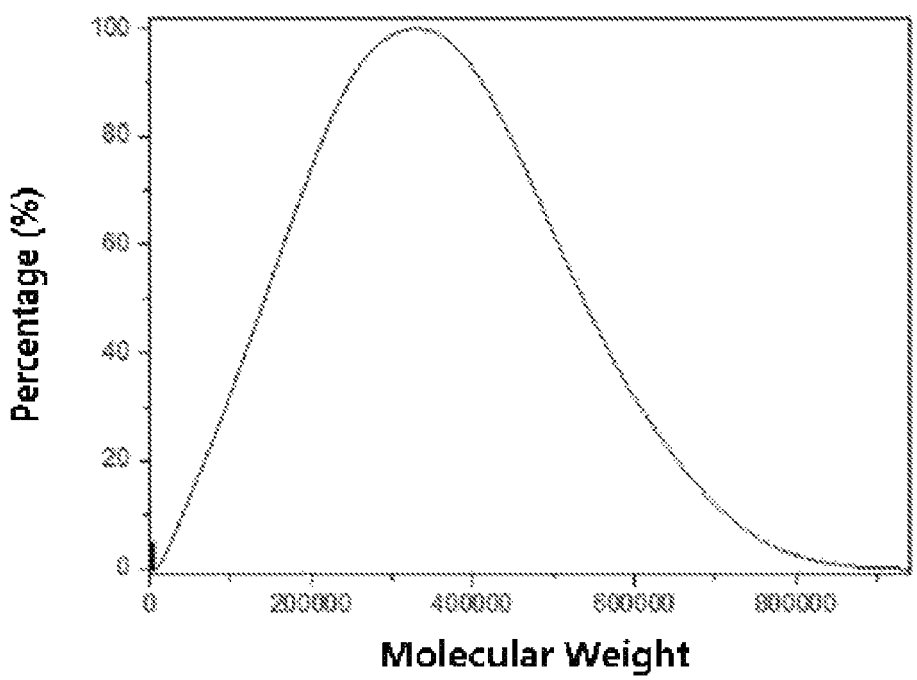
FIG. 4 shows the molecular weight distribution curve of the second slurry obtained in Example 5 of the present application.

As shown in FIG. 4, the weight average molecular weight of the second slurry is 31 W. The weight average molecular weight of 31 W is about 98%, which indicates that the molecular weight in the second slurry is mainly concentrated at 31 W. The percentage of the molecular weight range from 22 W to 45 W is 80% or more, which indicates that the process is stably controlled so that the second slurry mainly comprises long molecular chains.

Figure 5:
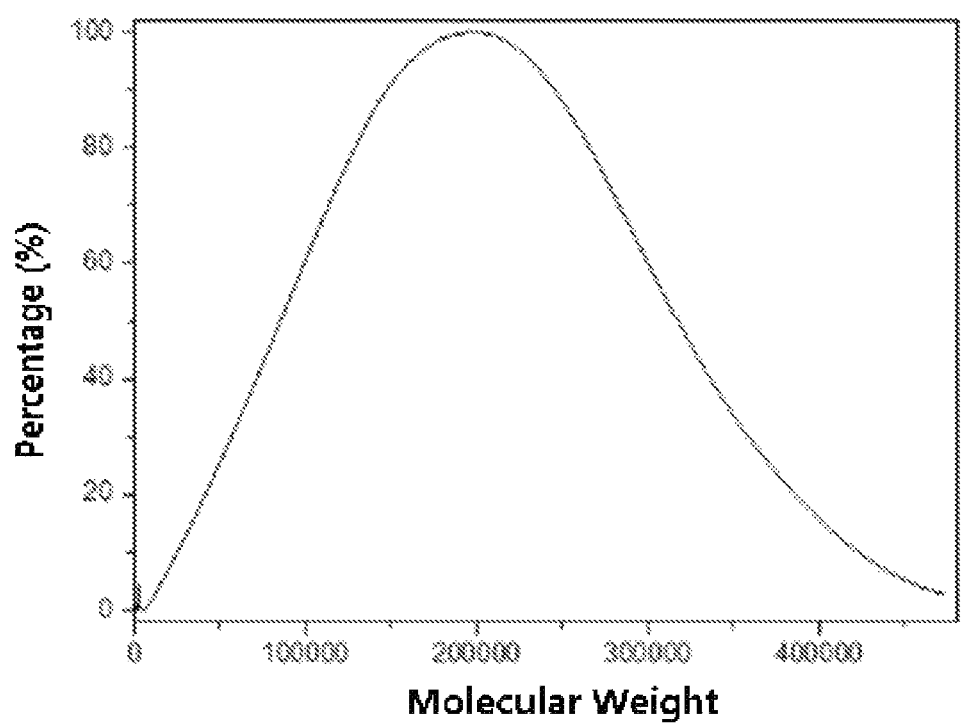
FIG. 5 shows the molecular weight distribution curve of the mixed slurry obtained in Example 5 of the present application.

As shown in FIG. 5, the weight average molecular weight of the mixed slurry was 20.8 W. The weight average molecular weight of 20.8 W is about 98%, which indicates that the molecular weight in the mixed slurry is mainly concentrated at 20.8 W. The percentage of the molecular weight range of 14 W to 26 W is 80% or more, which indicates that the process is stably controlled, so that the molecular chains in the mixed slurry can meet the requirements for spinning process.

Figure 6:
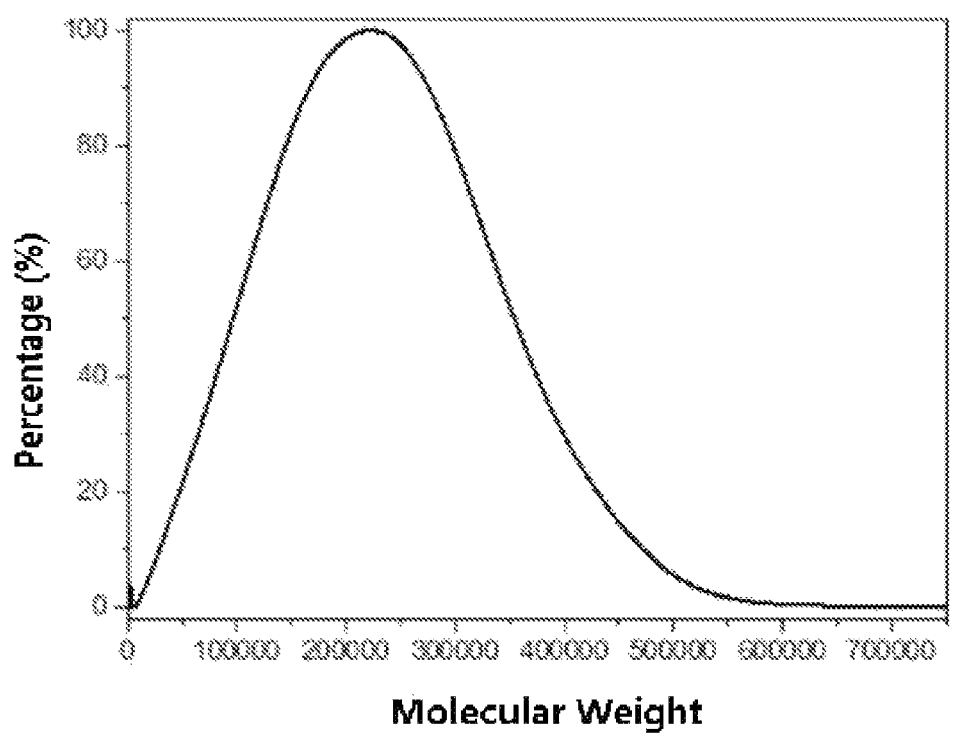
FIG. 6 shows the molecular weight distribution curve of the slurry obtained in the comparative example of the present application.

As shown in FIG. 6, the weight average molecular weight of the slurry is 21 W. The weight average molecular weight of 21 W is about 98%, which indicates that the molecular weight in the slurry is mainly concentrated in 21 W. The percentage of 13.5-27 W molecular weight range is 80%.

The Fiber indexes of Examples 1-5 and Comparative Example are shown in Table 1 below:

TABLE 1

The data of the Fiber indexes obtained Examples 1-5 and Comparative Example

|  | Fineness (dtex) | Force Value (cN) | elongation at break (%) | Breaking Strength (cN/dtex) | Modulus (cN/dtex) |
|---|---|---|---|---|---|
| Example 1 | 1.66 | 7.66 | 47.0 | 4.61 | 74.51 |

TABLE 1-continued

The data of the Fiber indexes obtained
Examples 1-5 and Comparative Example

|  | Fineness (dtex) | Force Value (cN) | elongation at break (%) | Breaking Strength (cN/dtex) | Modulus (cN/dtex) |
| --- | --- | --- | --- | --- | --- |
| Example 2 | 1.54 | 7.33 | 48.5 | 4.76 | 76.93 |
| Example 3 | 1.48 | 7.45 | 46.7 | 5.03 | 81.35 |
| Example 4 | 1.61 | 7.72 | 47.7 | 4.79 | 75.09 |
| Example 5 | 1.53 | 7.85 | 47.8 | 5.13 | 80.35 |
| Comparative Example | 1.72 | 6.57 | 28.07 | 3.83 | 60.76 |

It can be found from Table 1 that the meta-aramid fibers obtained according to the preparation method of the high-elongation meta-aramid fiber of the present application are significantly improved in elongation at break, which is higher than 45%. The breaking strength and modulus thereof are also obviously improved, reaching the expected inventive effect of the present application.

What is claimed is:

1. A preparation method of a high-elongation meta-aramid fiber, comprising the steps of:
   S1: adding isophthaloyl chloride to a first m-phenylenediamine solution and reacting at a stirring speed of 20-30 r/min to obtain a first reaction liquid, and then adjusting the pH of the first reaction liquid to 6.5-7.5 to obtain a first slurry, wherein the molar ratio of isophthaloyl chloride to m-phenylenediamine in the first m-phenylenediamine solution is (0.95-1.05):1;
   adding a first part of isophthaloyl chloride to a second m-phenylenediamine solution and performing a first reaction at a stirring speed of 25-35 r/min to obtain a second reaction liquid; adjusting the pH of the second reaction liquid to 6.8-8 and then filtering insoluble matter to obtain a pre-polymerized slurry; adding an initiator and a second part of isophthaloyl chloride to the pre-polymerized slurry at a stirring speed of 25-35 r/min to perform a second reaction so as to obtain a third reaction liquid; adjusting the pH of the third reaction liquid to 7-8 to obtain a second slurry, wherein the mass ratio of the first part of isophthaloyl chloride to the second part of isophthaloyl chloride is (85.7-96):(4-14.3), and the molar ratio of the total amount of the first part of isophthaloyl chloride and the second part of isophthaloyl chloride to the m-phenylenediamine in the second m-phenylenediamine solution is (1-1.1):1;
   S2: uniformly mixing the first slurry and the second slurry at a mass ratio of (3-7):(1-3) to obtain a mixed slurry; and
   S3: de-foaming the mixed slurry to obtain a spinning solution and producing the high-elongation meta-aramid fiber from the spinning solution through a wet spinning process,
   wherein in S3, the spinning solution is firstly coagulated to obtain a primary fiber, and the primary fiber is sequentially subjected to stretching, water washing at 50-60° C., drying at 125-135° C., and heat-treating at 310-325° C. to obtain a shaped fiber, and the shaped fiber is oiled and curl formed to obtain the high-elongation meta-aramid fiber;
   the coagulation bath used for coagulation is an aqueous solution of N,N'-dimethylformamide having a N,N'-dimethylformamide concentration of 56%-60% at a temperature of 9-11° C., and the stretching ratio is 0.8-1.1.

2. The preparation method of a high-elongation meta-aramid fiber according to claim 1, wherein in S1, the first m-phenylenediamine solution and the second m-phenylenediamine solution are the same kind of solutions having the same solvents which are N,N'-dimethylformamide, N,N'-dimethylacetamide or N-methylpyrrolidone, and the mass fraction of m-phenylenediamine in the solutions is 7%-12%.

3. The preparation method of a high-elongation meta-aramid fiber according to claim 1, wherein in S1, the reaction for obtaining the first reaction liquid is performed at a reaction temperature of 5-20° C. for a reaction time of 0.5-2 h; the reaction for obtaining the second reaction liquid is performed at a reaction temperature of −4-10° C. for a reaction time of 0.5-1.5 h; and the reaction for obtaining the third reaction liquid is performed at a reaction temperature of 27-40° C. for a reaction time of 10-25 min.

4. The preparation method of a high-elongation meta-aramid fiber according to claim 3, wherein in S1, after reacting at a stirring speed of 20-30 r/min for 0.5-2 h, adding a polymerization stabilizer to terminate the reaction to obtain the first reaction liquid, and then adding methylamine, dimethylamine, ethylamine or diethylamine to adjust the pH of the first reaction liquid to 6.5-7.5;
   adjusting the pH of the second reaction liquid to 6.8-8 by using ammonia gas, and after performing the second reaction at a stirring speed of 25-35 r/min for 10-25 min, adding a polymerization stabilizer to terminate the reaction to obtain the third reaction liquid, and then adding methylamine, dimethylamine, ethylamine or diethylamine to adjust the pH of the third reaction liquid to 7-8.

5. The preparation method of a high-elongation meta-aramid fiber according to claim 4, wherein in S1, the polymerization stabilizer is one or more selected from hydroquinone, p-tert-butylcatechol, 2,6-di-tert-butyl-p-cresol, propyl gallate, ethoxyquinoline, 2,6-di-tert-butyl p-cresol, bisphenol A, 4,4'-dihydroxybiphenyl, p-toluidine, diphenylamine, benzidine, p-phenylenediamine and N-nitrosodiphenylamine;
   the initiator is cumene hydroperoxide, tert-butyl hydroperoxide, benzoyl peroxide, lauroyl peroxide, di-tert-butyl peroxide, dicumyl peroxide, diisopropyl peroxydicarbonate, dicyclohexyl peroxydicarbonate, a mixture a or a mixture b, wherein the mixture a is a mixture of cumene hydroperoxide and ferrous chloride, and the mixture b is a mixture of benzoyl peroxide and N,N-dimethylaniline;
   in S1, the mass of the polymer stabilizer added after reacting at a stirring speed of 20-30 r/min for 0.5-2 h is 0.1%-0.8% of the mass of the m-phenylenediamine in the first m-phenylenediamine solution; the mass of the polymer stabilizer added after performing the second reaction at a stirring speed of 25-35 r/min for 10-25 min is 0.1%-0.2% of the mass of the m-phenylenediamine in the second m-phenylenediamine solution; and the mass of the initiator is 0.06%-0.35% of the mass of the m-phenylenediamine in the second m-phenylenediamine solution.

6. The preparation method of a high-elongation meta-aramid fiber according to claim 1, wherein in S1, the first slurry has a viscosity of 100-450 Po and a molecular weight of 5-10 W, and the second slurry has a viscosity of 1500-2500 Po and a molecular weight of 30-40 W.

7. The preparation method of a high-elongation meta-aramid fiber according to claim 1, wherein the stretching is carried out for four times in a stretching bath which is an aqueous solution of N,N'-dimethylformamide, wherein: for the first stretching, the stretching bath has a concentration of 53%-55% at a temperature of 8-9° C., and the stretching ratio is 1.9-2.2; for the second stretching, the stretching bath has a concentration of 51%-52.5% at a temperature of 9.2-10.5° C., and the stretching ratio is 1.2-1.4; for the third stretching, the stretching bath has a concentration of 49.5%-50.5% at a temperature of 11-12° C., and the stretching ratio is 1.1-1.2; and for the fourth stretching, the stretching bath has a concentration of 48.5%-49% at a temperature of 12-13.5° C., and the stretching ratio is 1.0-1.1.

8. A high-elongation meta-aramid fiber obtained from the preparation method of a high-elongation meta-aramid fiber according to claim 1.

\* \* \* \* \*